United States Patent
Willets et al.

(10) Patent No.: US 11,537,583 B2
(45) Date of Patent: Dec. 27, 2022

(54) SYSTEM AND METHOD FOR BLOOM FILTERS IN LARGE SCALE APPLICATIONS

(71) Applicant: Samsung Electronics Co., Ltd., Suwon-si (KR)

(72) Inventors: Kendall Willets, Mountain View, CA (US); Chandrashekar Muniyappa, Mountain View, CA (US); Sriraman Krishnamoorthy, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 121 days.

(21) Appl. No.: 17/038,351

(22) Filed: Sep. 30, 2020

(65) Prior Publication Data

US 2021/0117398 A1    Apr. 22, 2021

Related U.S. Application Data

(60) Provisional application No. 62/909,020, filed on Oct. 1, 2019.

(51) Int. Cl.
| | | |
|---|---|---|
| G06F 16/00 | (2019.01) | |
| G06F 16/22 | (2019.01) | |
| G06F 16/28 | (2019.01) | |
| G06F 16/2455 | (2019.01) | |
| H04B 1/38 | (2015.01) | |
| H04L 67/10 | (2022.01) | |

(52) U.S. Cl.
CPC ...... *G06F 16/2264* (2019.01); *G06F 16/2456* (2019.01); *G06F 16/285* (2019.01); *H04B 1/38* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,678,860 B1 * | 6/2020 | Duffield | G06F 16/24578 |
| 2003/0005036 A1 * | 1/2003 | Mitzenmacher | H04L 67/288 |
| | | | 709/216 |
| 2005/0114391 A1 * | 5/2005 | Corcoran | G06F 9/4401 |
| 2017/0300490 A1 * | 10/2017 | Kachemir | G06F 7/24 |
| 2018/0089245 A1 * | 3/2018 | Warren, Jr. | G06F 16/235 |
| 2019/0095472 A1 * | 3/2019 | Griffith | G06F 16/285 |

OTHER PUBLICATIONS fsaintjaques, et al. "libtwiddle", GitHub, Published Oct. 26, 2019, https://github.com/fsaintjacques/libtwiddle, Accessed on Sep. 29, 2020, 3 pages.
FaceBook/zstd, et al. "Zstandard—Fast real-time compression algorithm", GitHub, Published Sep. 24, 2020, https://github.com/facebook/zstd, Accessed on Sep. 29, 2020, 7 pages.

* cited by examiner

*Primary Examiner* — Anhtai V Tran

(57) ABSTRACT

A system and method for implementing bloom filters in large scale applications is disclosed. The system and method include at least one processor configured to create a plurality of sharded bloom filters based on signatures stored in the memory, perform at least one lookup using the plurality of sharded bloom filters; and output a lookup result in real time.

20 Claims, 10 Drawing Sheets

SYSTEM AND METHOD FOR BLOOM FILTERS IN LARGE SCALE APPLICATIONS

CROSS-REFERENCE TO RELATED APPLICATIONS AND PRIORITY CLAIM

This application claims priority under 35 U. S.C. § 119(e) to U.S. Provisional Patent Application No. 62/909,020 filed on Oct. 1, 2019, which is hereby incorporated by reference in its entirety.

TECHNICAL FIELD

This disclosure relates generally to Bloom Filters. More specifically, this disclosure relates to using bloom filters in large scale applications for faster processing.

BACKGROUND

Advertisement (ad) servers may be one or more application servers that are used by various entities, such as advertisers and ad networks, to run and manage advertising campaigns. An ad server is mainly used to serve an ad to a device. ad servers receive an ad request from devices such as televisions (TVs), or other devices that are configured to receive advertisements. Once the ad request is received, the ad server may perform a linear scan of all the existing placements to find a matching placement based on the ad campaign's targeting dimensions. Once a matching placement is found, an ad is served to the device.

Unfortunately, performing a linear scan of all existing placements takes a significant amount of CPU time, wasting copious system resources resulting in service level agreement (SLA) time-outs and potential revenue loss. When scaling for a large request volume, system resources are further strained. Solutions are needed to address these deficiencies.

SUMMARY

This disclosure provides techniques for sharded include and exclude bloom filters for use in high scale applications.

In a first embodiment, an electronic device includes at least one memory, and at least one processor operatively coupled to the at least one memory. The at least one processor is configured to create a plurality of sharded bloom filters based on signatures stored in the memory; perform at least one lookup using the plurality of sharded bloom filters; and output a lookup result in real time.

In a second embodiment, a method includes creating, by an electronic device, a plurality of sharded bloom filters based on signatures stored in the memory. The method also includes performing, by the electronic device, at least one lookup using the plurality of sharded bloom filters. Furthermore, the method includes outputting, by the electronic device, a lookup result in real time.

In a third embodiment, a non-transitory machine-readable medium contains instructions. The plurality of instructions, when executed, cause at least one processor of an electronic device to create a plurality of sharded bloom filters based on signatures stored in the memory; perform at least one lookup using the plurality of sharded bloom filters; and output a lookup result in real time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as Samsung HomeSync™ Apple TV™, or Google TV™), a gaming console (Xbox™, PlayStation™), such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
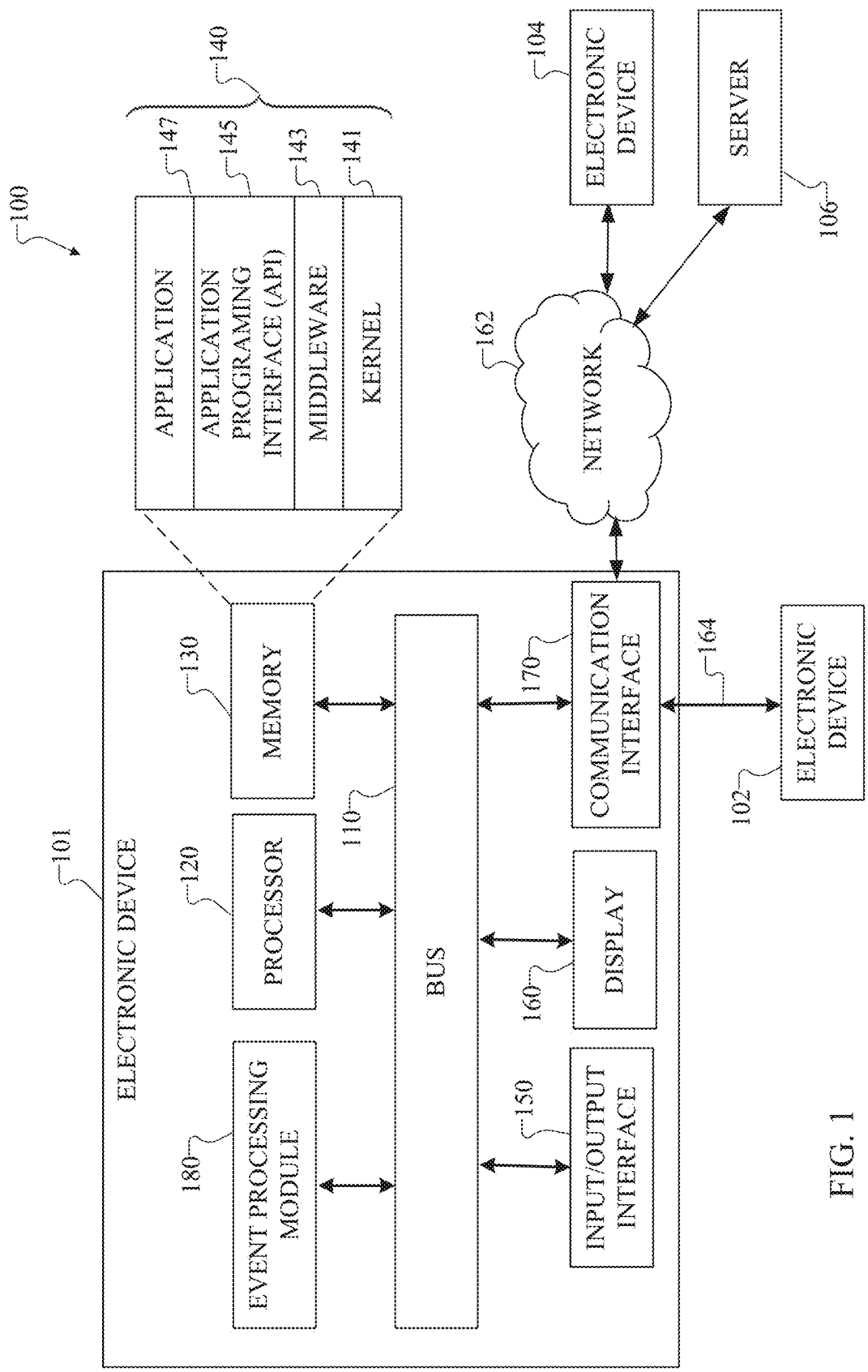
FIG. 1 illustrates an example network configuration including an electronic device in accordance with certain embodiments of this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. For example, while exemplary embodiments may be indicated as applicable to a particular device category (e.g., TVs, computers, smartphones, etc.) the processes and examples provided are not intended to be solely limited to the device category and can be broadly applicable to various device categories (e.g., appliances, computers, automobiles, etc.). The same or similar reference denotations may be used to refer to the same or similar elements throughout the specification and the drawings.

As referenced above, in response to receiving an Advertisement (Ad) request from an electronic device such as a TV, an ad server may perform a linear scan of large datasets to find a matching placement, which may strain system resources and increase processing time. This is especially true in dynamic environments with rapidly changing data, such as in an advertisement context.

A bloom filter, as used herein, is a probabilistic data structure that may be used to determine whether an element is a member of a set. A bloom filter includes a bit vector of a configurable length. The output of a bloom filter may be referred to as a bloom filter signature. A bloom filter signature, as used herein, is a representation of a large set of elements in a bounded amount of state (bits). Based on business requirements, accuracy required, or other parameters, the number of bits, the bloom filter's length, number of elements, and the value of (k) hash functions may be configurable. Bloom filters can offer fast lookups on datasets. However, due to the memory required by bloom filters to represent the data, they are used with small datasets. For larger datasets, bloom filters require a larger memory footprint. Bloom filters may be built for both include and exclude datasets. However, building exclude sets for bloom filters can be challenging. For example, using traditional SQL join operations to build hypercubes of exclude set bloom filter signatures from trillions of records will be time consuming and use system resources that could be used for other or unrelated processing. The bloom filter process is unlikely to complete even with ample system resources. For example, in the context of building exclude set hypercubes of bloom filters, a Cartesian product approach of all sets and all possible elements; i.e. {(set, element)}, may be used.

Next, existing (set, element) pairs may need to be removed with an antijoin operation. This process may become intractable when the Cartesian product is large. For example, when the Cartesian product contains trillions of elements.

The burden on system resources may be reduced by implementing certain embodiments according to this disclosure, improving the overall performance of the system. Further, an improvement in runtime optimization for advertisement placement may also be achieved. For example, in an advertisement context, the entire process from receiving an ad request to outputting a winning ad may be performed in microseconds. A reduction in processing time may also improve ad matching placement because the processing may run in real-time. Certain embodiments of this disclosure provide systems and methods for improving advertisement placement matching speeds using bloom filters, while addressing memory related footprint issues. For example, memory footprint related issues may be circumvented using sharding techniques. The improvement realized in advertisement matching speeds may also contribute to serving more relevant targeted advertisements in real-time.

In certain embodiments of this disclosure, bloom filters may be efficiently applied to large datasets containing trillions of records and perform lookups in microseconds to find an element among trillions of elements.

Certain embodiments of the present disclosure illustrate transmitting the include and exclude data sets over a network in a compressed format to provide a real-time lookup of an element by an online application, such as an ad server.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Certain embodiments according to this disclosure may efficiently implement bloom filters on large datasets using sharding techniques. Bloom filters may be created for include and exclude datasets comprising trillions of records. The bloom filters may be built for partial hypercubes, including a base cuboid for each possible include subset and a base cuboid for each possible exclude subset. As used herein, the term cube or hypercube refers to a multidimensional dataset. A cuboid refers to one combination of dimensions. The bloom filters may be implemented using sharding techniques in order to perform faster lookups, thereby optimizing runtime. Sharding refers to a data tier architecture where data is horizontally partitioned across independent database instances. Each independent database instance may be referred to as a shard. Statistical techniques may be applied to efficiently build the bloom filters and transmit them over a network so that they may be utilized by any online or offline application for fast lookups. In certain embodiments according to this disclosure, the statistical techniques mentioned above are applied to an ad server application for membership checks at runtime. For example, bloom filters may be broadcasted over a network so that an online application, such as an ad server, may use the bloom filter for caching. The bloom filters may be transmitted over a network in a compressed format. By using bloom filters in accordance with certain embodiments of this disclosure, an online application may be able lookup an element in real-time.

Generally, building the datasets and applying sharding techniques may take place offline and stored in an in-memory cache that is refreshed using a schedular or by other methods that may refresh the signatures. In the advertisement context, when an ad request is received, lookup times may be reduced because if there is no match in the signature stored in the cache, processing stops. However, if a match is found in the signature, the ad matching placement process may continue. In either case, runtime processing for serving an ad in response to an ad request from an electronic device such as a TV may be reduced.

Figure 2:
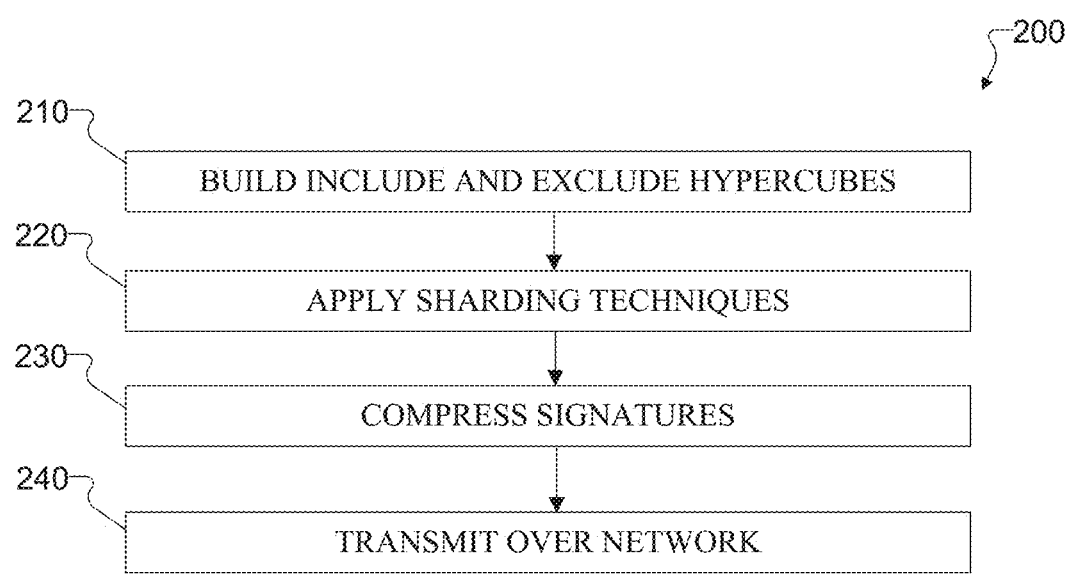
FIG. 2 illustrates a simplified process for building and using bloom filter signatures of large datasets in accordance with certain embodiments of this disclosure.

FIG. 2 illustrates a simplified process 200 for building and using bloom filter signatures of large datasets. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor and transmitter circuitry in, for example, an ad server.

At operation 210, include and exclude hypercubes may be constructed based on targeting dimensions. To represent data in a bloom filter, partial hypercubes may be built by constructing the base cuboid for each subset using the bloom filter probabilistic data structure. In certain embodiments, the bloom filter data structure may be developed in $C^{++}$ or other similar programming languages that may be used to build the include and exclude hypercube base cuboids.

At operation 220, sharding techniques may be applied to the bloom filters. Sharding techniques include a database partitioning that separates very large databases into smaller, faster, and more easily manageable parts referred to as "shards". That is, data from the database may be spread across multiple computers or processing systems. The sharding techniques may take place offline and stored in an in-memory cache that is refreshed using a schedular or by other methods that may refresh the signatures At operation 230, the constructed signatures may be compressed and stored in the memory. The signatures generated may be stored in a compressed format by applying, for example, the Z-Standard lossless compression technique (Zstd).

At operation 240, a configurable schedular may fetch the compressed signatures and transmit them over the network. For example, updated signatures may be fetched every 15 minutes.

Figure 3:
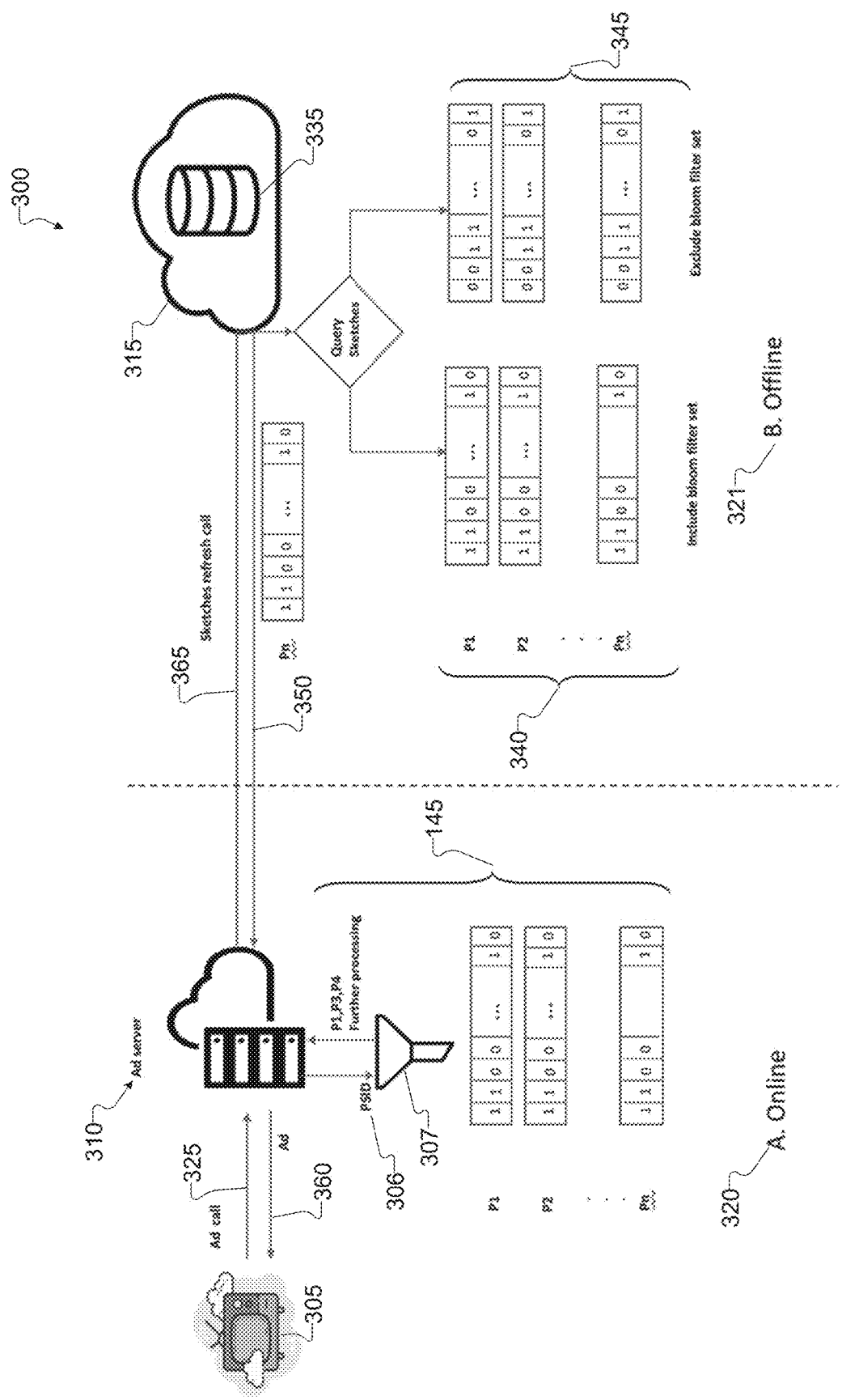
FIG. 3 illustrates an implementation of an ad placement process in accordance with certain embodiments of this disclosure.

FIG. 3 illustrates an exemplary system architecture of an embodiment in accordance with this disclosure. The embodiment of the system 300 shown in FIG. 3 is for illustration only. Other embodiments could be used without departing from the scope of the present disclosure.

System 300 may include electronic device 305, ad server 310, and cloud based platform 315. Electronic device 305, ad server 310, and cloud based platform 315 may comprise one or more electronic devices 101, 102, 104, and 106 of FIG. 1. Electronic device 305 may be identified on the network via its unique identifier, such as Personalized Service Identifier (PSID) 306. Unique identifier, such as PSID 306, may be known or unknown to ad server 310.

For illustrative purposes, system 300 is divided into two processing components: online processing 320 and offline processing 321. During the online processing 320, electronic device 305 may send an ad request 325 to ad server 310. The ad request 325 may include a unique identifier 306 associated with electronic device 305 and targeting dimensions. Targeting dimensions may be associated with an ad campaign. Targeting dimensions for an ad campaign may include age, gender, country, city, or any other criteria that may be relevant to the particular ad campaign. Ad server 310 may invoke an API 145 by passing the unique identifier 306 to API 145. API 145 may be a bloom API or other API. The API may be built in C' or any other suitable programming language. API 145 may perform a lookup using bloom filters 307 to determine if the unique identifier is present in the final signatures of the live candidate ad placements (P1, P2, . . . PN). If a match is found, electronic device 305 may be considered as qualifying for further evaluations. If electronic device 305 qualifies, API 145 may return the matching ad placements (P1, P3, P4) for further processing. The ad server 310 will continue to evaluate the candidate ad placements (P1, P3, P4) for the remaining set of targeting dimensions (rules, criteria, etc.) related to ad request 325. If a final placement match is found, the match is considered a winner, the ad 360 may be sold. If a match is not found, the processing ends. A match may not be found, for example, because electronic device 305 may not be known to ad server 310 yet or may currently be offline. Further, some electronic devices 305 may not be in any category of the dimension or any other targeted dimension.

In the offline processing 321, a schedular 365 on ad server 310 may refresh the signatures in memory based on a preset interval and/or other parameters. The raw dimensional data will be processed by the ETL jobs and hypercubes with include and exclude set signatures are built and stored in database 335. The processing may be part of offline processing comprising several jobs to process various targeting dimensions (not shown). For example, the raw data may be stored in a cloud platform, such as AMAZON WEB SERVICES (AWS) S3 buckets or other cloud-based platforms

315. The call 365 to refresh the signatures may query 330 database 335 for both include set signatures 340 and exclude set signatures 345; i.e., sketches, for the configured targeting criteria. A sketch is a summary of a large data stream. A bloom filter signature is an example of a sketch. The final signatures 350 may be built from the refreshed data for a given placement that represents all devices 305 that satisfy the given targeting criteria. These final signatures 350 may be cached in the memory of ad server 310 for fast lookups, as illustrated in online processing 315.

Figure 4A:
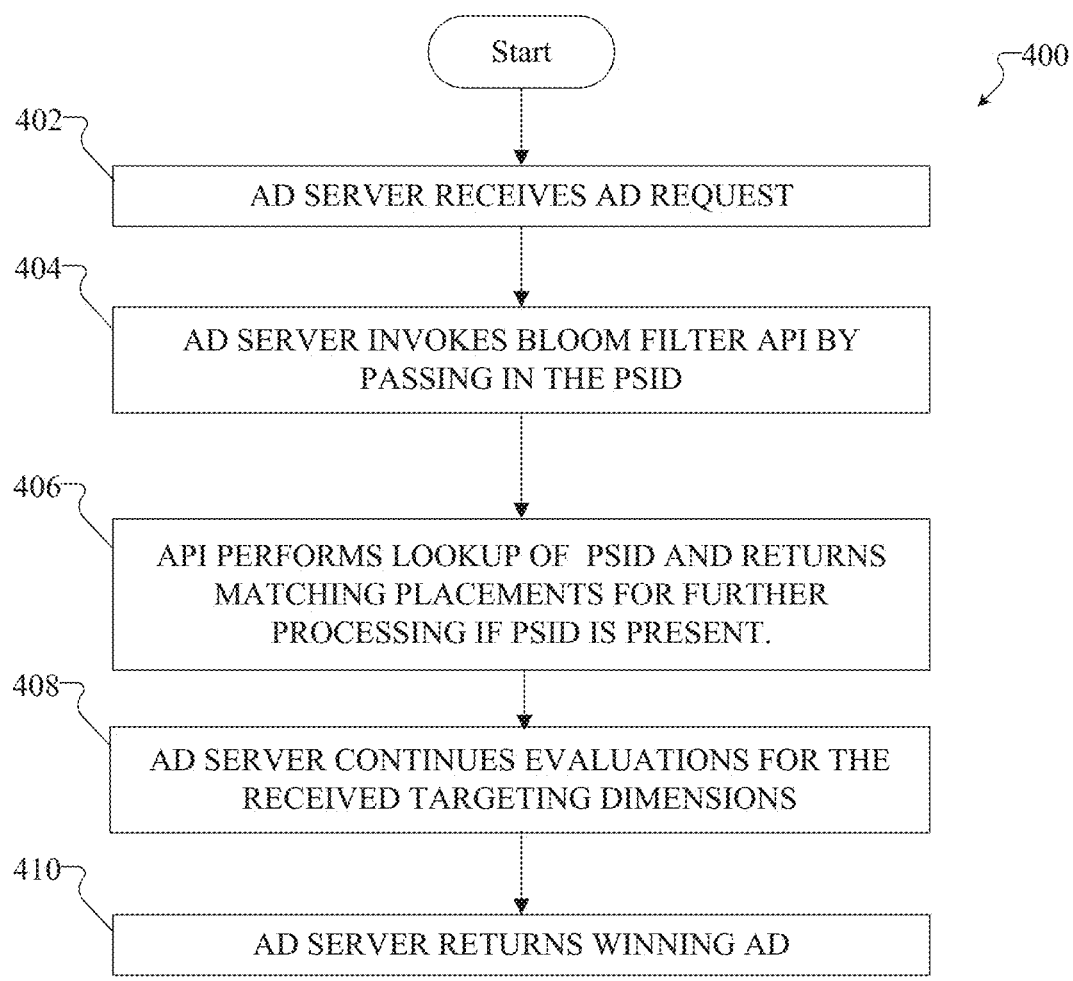
FIG. 4A illustrates a simplified process for an example implementation of processing an incoming ad request in accordance with certain embodiments of this disclosure.

FIG. 4A illustrates a simplified process for an example implementation of processing an incoming ad request 325 from an ad server 310, as described in more detail above in the description of FIG. 3. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor and transmitter circuitry in, for example, electronic device 101.

In this example, the electronic device 101 may be a television (TV) 305 or another type of electronic device that is capable of receiving and playing media that includes advertisements. For simplification purposes, in the example illustrated in FIG. 4A, the electronic device 101 is a TV 305. At operation 402, Ad server 310 receives an ad request 325 from TV 305. The received ad request 325 may include targeting dimensions and a unique identifier. In the illustrated example, unique identifier is PSID 306. For example, the PSID 306 may be the MAC address of the TV 305. At operation 404, the ad server 310 invokes API 145 by passing the received PSID 306. API 145 may be a bloom filter API. At operation 404, API 145 may perform a lookup to determine if the received PSID 306 is present in the signature for live placements. If PSID 306 is not present in the signature, the processing ends. If PSID 306 is present in the signature for live placements (P1,P2,P3,Pn), API 145 will return the matching placements (P1,P3,P4) for further processing. At step 408, ad server 310 continues to evaluate the candidate placements (P1,P3,P4) for the rest of the targeting dimensions received. At step 410, ad server 310 returns an ad response (i.e. winning Ad) to TV 305.

Figure 4B:
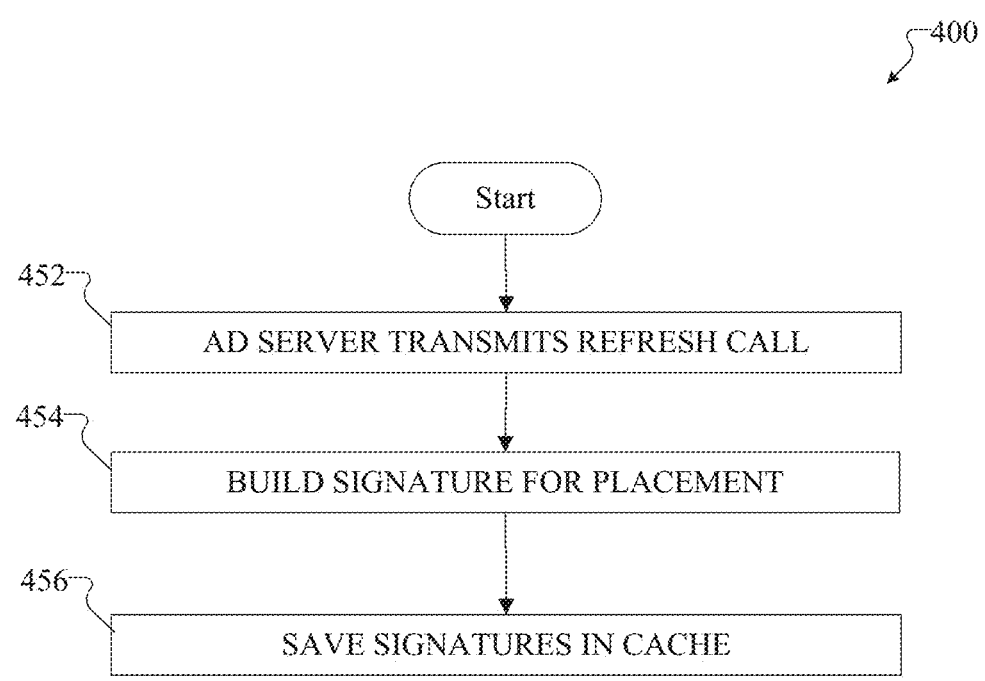
FIG. 4B illustrates a process of an ad server updating signatures in accordance with certain embodiments of this disclosure.

FIG. 4B illustrates a process 450 for an ad server updating signatures in accordance with certain embodiments of this disclosure. At operation 452, the scheduler on the ad server may transmit a call to refresh its signatures. The refresh call may query both include and exclude set signatures for the configured targeting criteria. At operation 454, the refresh call may build the final signature for a given placement that represents all the TVs satisfying the given targeting criteria. At operation 456, the created final signatures may be cached in the ad server memory for fast lookups when the ad server receives an ad request.

According to certain embodiments, the first step in the process of building bloom filter signatures may be to build include and exclude hypercubes. To represent data in a bloom filter, partial hypercubes may be built by constructing the base cuboid for each subset using the bloom filter probabilistic data structure. In certain embodiments, the bloom filter data structure may be developed in C++ or other similar programming languages that may be used to build the include and exclude hypercube base cuboids.

To build the exclude base cuboid, the structures may admit a union operation. The exclude base cuboid may need to be built from individual elements. One method is to generate the cartesian product {(set, element)} of all sets and all possible elements, and to remove existing (set, element) pairs with an antijoin operation. As described above, this approach may become intractable when the cartesian product is large (e.g. in the trillions). Each candidate pair may generate a lookup or join cost. An insertion cost in the signature may also be applied. When the sets are small, their complements are large and often contain common elements. When implementing on multidimensional large-scale applications, this method may not be possible as described above.

The following example illustrates some of the issues arising from the above method in an advertisement campaign with eleven targeting dimensions. One of the eleven targeting dimensions may be "program." The program dimension may have 10 million unique device ids (e.g., PSIDs). Taking the cartesian product of the PSIDs and the programs may result in 400 Trillion elements. As described above, it is not optimal to use SQL joins to address this issue. Further, the process may not even complete regardless of available system resources.

One approach to overcome the problems discussed above may be to split the datasets into different subsets (e.g. categories), and to aggregate the complement once for each category. A common base signature which applies to every set in a group may be aggregated. Bloom filter signatures may be generated for each of the different subsets. Finally, all the layers may be joined into a final result.

For example, given a collection of random {sets s_1, ... , s_n}, each set chosen with a fixed probability (p) from a set of possible elements (U), the probability that an element (x) is not in s_i (q) is (1−p); i.e. q=(1−p). The probability that element (x) is in none of the sets is $q^n$. If the sets are distributed evenly into (s) subcategories, the probability of the element (x) being in none of the sets in a subcategory is: $q^n/s$. For many values of (q) and (n), (s) may be chosen so that $q^n/s \gg 0$. That is, each subcategory has a substantial complement which is eliminated from the next level of recursion.

The number of elements in (s) such exclude sets is: $O(s*q^n/s)$. In practice, different values of (s) may be experimented with to minimize processing time and overall resource optimization. For example, if the value of (s) is too small a value, elements may not be eliminated (i.e. $q^n/s \approx 0$), while too large a value may result in too many elements (and exclude sets) to process.

Exclude sets are often rather large and have a lot of common elements from one exclude set to the next. In accordance with this disclosure, a method of building a common root set (i.e., a common signature) that is common to all sets within a given taxonomy is described herein. This approach may be applied to each level (or layer) in a given hierarchical taxonomy. For example, the second or third level set may include the difference between the common root set and the exclude set for different categories or different groups of categories. Grouping categories into a common root set that applies the difference described above may account for elements that are not in any category of the dimension. For example, electronic devices that are not currently online may be included in the common root set. Another example may be electronic devices that do not have the attributes of one of the other dimensions being targeted. These elements (e.g. electronic devices) may be grouped as the common root set. The common root set may only need to be built once. The common root set may be combined with an individual exclude set in the bloom filter at the signature level. This method may be far more efficient than combining a large number of elements for all of the different subsets.

Figure 5:
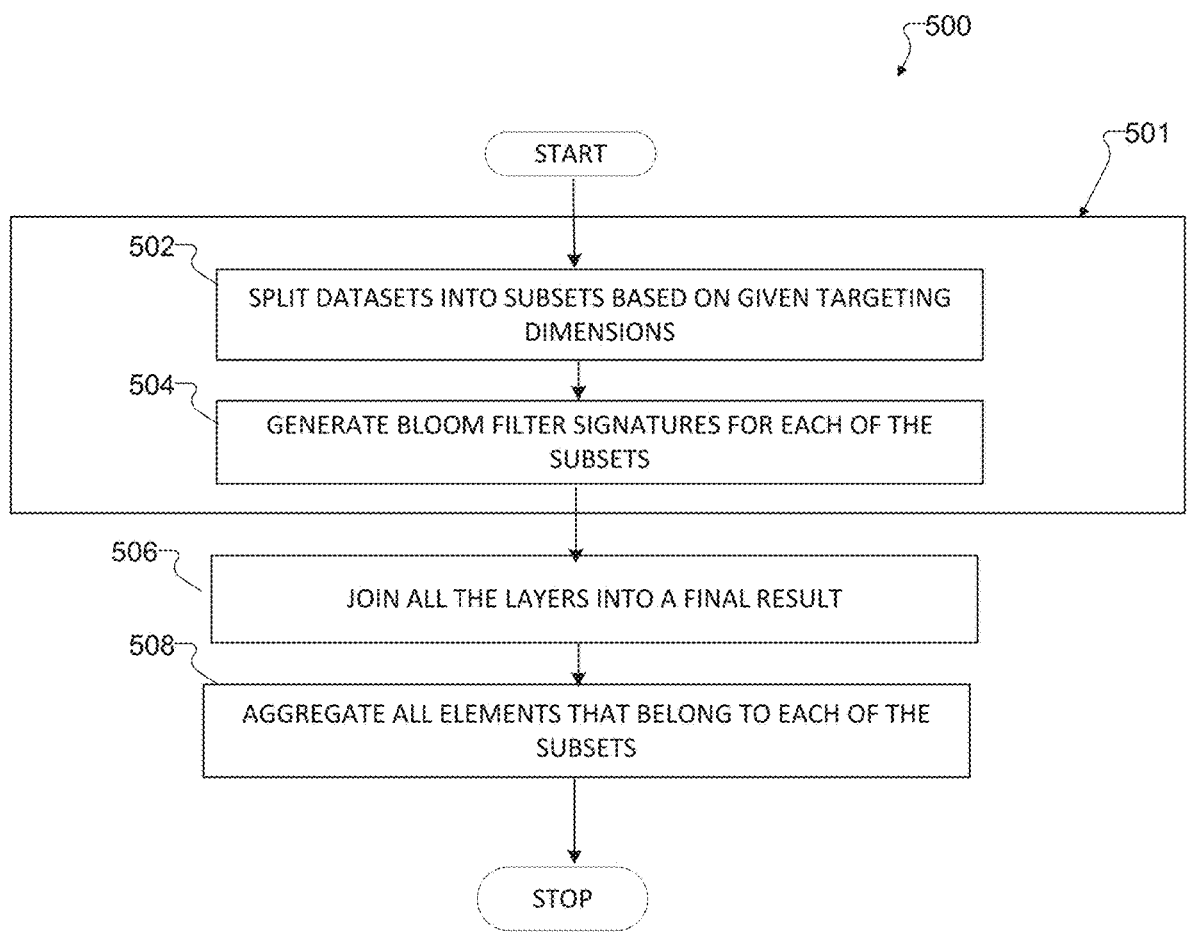
FIG. 5 illustrates a process flow for creating bloom filters for include and exclude sets in accordance with certain embodiments of this disclosure.

FIG. 5 illustrates a simplified process 500 for creating bloom filters for include and exclude sets in accordance with this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example is implemented by processor and transmitter circuitry, for example, a server.

In operation 501, an exclude base cuboid is constructed by implementing operations 502 and 504. In operation 502, the datasets may be split into different subsets based on targeting dimensions. In operation 504, bloom filter signatures may be generated for each of the subsets. In operation 506, subcategories may be built by using a partial join. That is, by joining all the layers into a final result. At operation 508, the include base cuboid may be built by directly aggregating all elements that belong to each of the subsets.

Figure 6A:
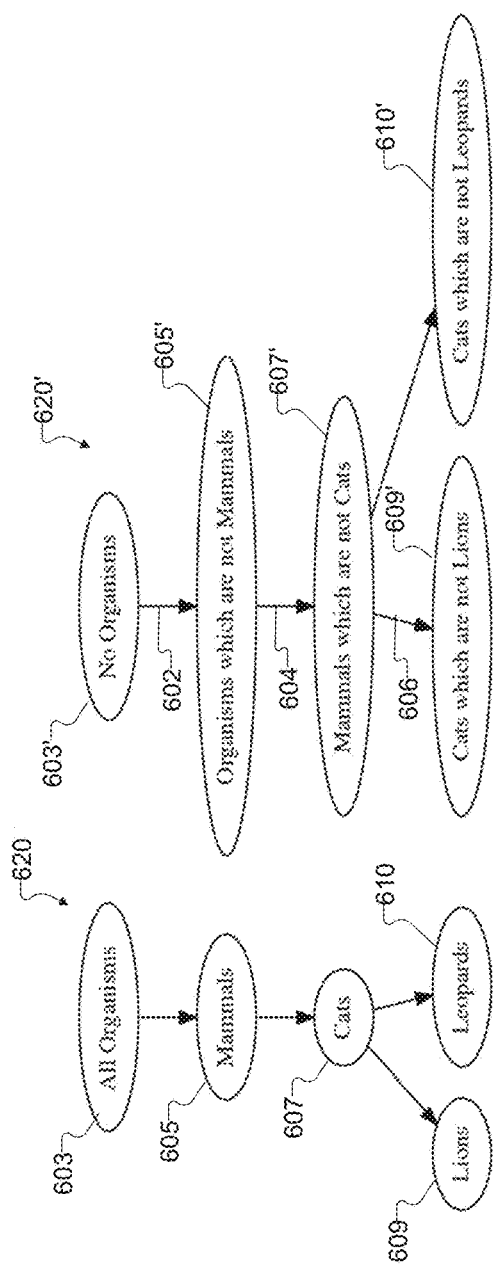
FIGS. 6A and 6B illustrate high level examples of building exclude hypercubes in accordance with certain embodiments of this disclosure.
Figure 6B:
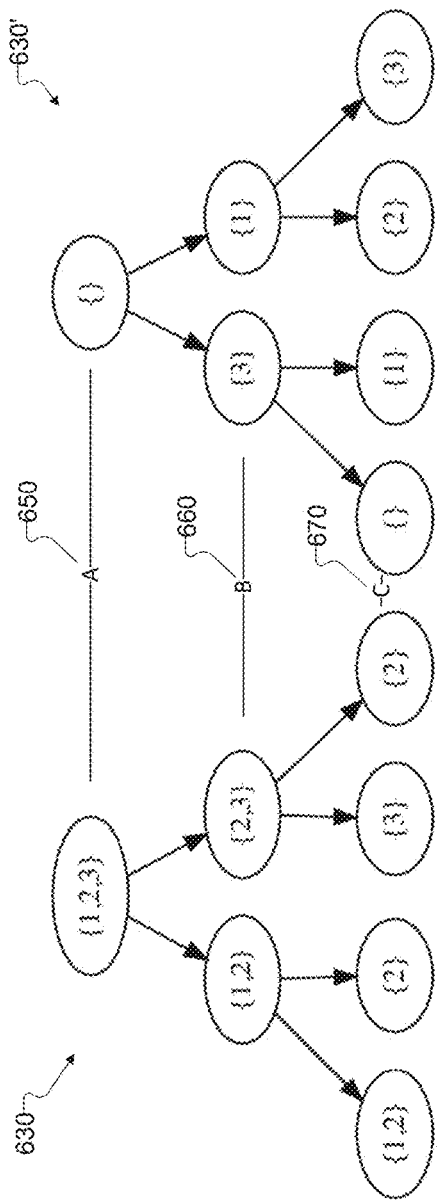

FIGS. 6A and 6B illustrate high level examples of building exclude hypercubes based on given criteria. The examples shown in FIGS. 6A and 6B are for illustration only. Other examples could be used without departing from the scope of the present disclosure.

In the example shown in FIG. 6A, a method of aggregating all organisms that are not lions using a hierarchical dimensional structure in accordance with certain embodiments of this disclosure is illustrated. FIG. 6A illustrates hierarchy 620 and its complement 620'. Hierarchy 620 includes all organisms set 603, all mammals set 605, all cats set 607, all lions set 609, and all leopards set 610. Hierarchy 620', i.e., the complement of hierarchy 620, includes no organisms set 603', organisms which are not mammals set 605', mammals which are not cats set 607', cats which are not lions set 609', and cats which are not leopards set 610'.

Hierarchy 620 may be organized by categories, subcategories, etc., all the way down to individual sets. For example, hierarchy 620 may begin at the organism set 603 and move down to the individual levels, such as lions set 609 and leopards set 610. Hierarchy 620' may begin at the no organism set 603 and move down to the individual levels, such as cats which are not lions set 609', and cats which are not leopards set 610'.

At operation 602, all organisms that are not mammals are aggregated, resulting in an exclude set for organisms. Within the mammals category, at operation 604, all mammals that are not cats may be aggregated, resulting in an exclude set for mammals that are not cats. As discussed above, it may be helpful to identify a common root set. A common root set may be the highest level set in a hypercube. In this example, all organisms that are not in the mammals category, i.e. the exclude set for mammals which are not cats, may be the common root set for hierarchy 620'. Next, at operation 606, within the "cats" category, all cats that are not lions (e.g. house cats, leopards, etc.) may be aggregated, resulting in an exclude set for cats that are not lions.

Using the summary level sets described above, they may be aggregated by following down the hierarchy. For example, all organisms that are not mammals, all mammals that are not cats, and all cats that are not lions may be aggregated, resulting in the set of all organisms which are not lions; i.e. the exclude set for lions.

Now that summary level sets have been created for this exemplary hierarchical taxonomy, other related criteria may be applied to the data without having to rebuild the larger datasets. For example, in order to aggregate all organisms which are not leopards, the subsets at the top of the previously created hierarchy may be reused instead of having to again create the larger sets such as all organisms and all mammals. That is, in order to aggregate all organisms which are not leopards, the union of the first two sets, i.e., the union of (previously created) exclude organism set and the exclude mammals that are not cats set 604 may be performed. The only sets that may need to be constructed are sets for cats which are not leopards. Now that a hierarchical taxonomy of exclude sets has been implemented, upper level sets do not need to be recreated, saving system resources and time. In some applications, this could result in performing the steps once instead of millions of times, saving time and resources. Incremental exclude sets may be built by grouping datasets into levels and categories. For example, using the example of FIG. 6A, by creating a few summary sets of higher levels such as mammals that are not cats and then smaller level exclude sets such as cats that are not lions, aggregating these sets are much smaller sets to aggregate instead of aggregating all organisms that are not cats directly, which may include millions of elements. Once all incremental excludes sets are built, a taxonomy may no longer be needed and random groupings may be assigned instead. For example, if the sets are small enough, a random grouping may be applied.

When sets, such as the sets described above, are represented by signatures, CPU processing may decrease because the same elements will not need to be added repeatedly for each set in a category. In some implementations, run time processing may improve by an order of magnitude or more. Since there may be more than one instance of the same element in a set, a uniquely assigned taxonomy technique may be performed.

For example, in some situations, an assigned taxonomy may not have been established yet and thus, may need to be created. The ability to create a taxonomy may provide added flexibility in configurations. For example, the number of categories and/or levels may be configured based on business rules and other requirements. Sets may be assigned to categories based on criteria such as set size. Random groupings, as described above, may also be applied. One method of random grouping may be applying a pseudo-random hash of the set identifier may also be assigned.

The following explanations and exemplary scripts and commands are intended for illustrative purposes and to gain a greater understanding of this disclosure. Other scripts, commands, or formats could be used without departing from the scope of the present disclosure. Reference to SQL queries, scripts, commands, etc., or to any other database access language, programming language, platform, etc., should in no way limit the scope of this disclosure.

With reference to FIG. 6A, the following exemplary script illustrates a method of building each level of a taxonomy individually using a SQL script. For example, from a table SETS with columns kingdom, phylum, class, and element_id, the complement of each kingdom may be constructed as follows:

```
drop table if exists sets;
create temporary table sets(
        element_id varchar(50),
        kingdom varchar(50),
        phylum varchar(50),
        class varchar(50)
)
on commit preserve rows;
insert into sets(kingdom, phylum, element_id)
select 'animalia', 'chordata', 'lion'
union select 'animalia', 'chordata', 'leopard'
union select 'animalia', 'echinodermata', 'starfish'
union select 'fungi', 'basidiomycota', 'mushroom'
union select 'plantae', 'tracheophytes', 'fern'
union select 'plantae', 'tracheophytes', 'redwood'
SELECT kingdom, bf_agg_shard(e.element_id using parameters nshard=1,
nbits=120000000,k=2)
FROM
(
    SELECT kingdom, element_id
    FROM (select distinct element_id from SETS) e
    CROSS JOIN (select distinct kingdom from SETS) c
    MINUS
    SELECT kingdom, element_id
    FROM SETS
) X
GROUP BY kingdom;
```

The operation above creates a Cartesian product since no join condition is specified. In order to build subcategories, a partial join may be constructed as follows:

```
SELECT kingdom, phylum, bf_agg_shard(e.element_id using parameters
nshard=1, nbits=120000000,k=2)
FROM
(
    SELECT c.kingdom, c.phylum, element_id
    FROM (select distinct kingdom, element_id from SETS) e
    JOIN (select distinct kingdom, phylum from SETS) c
    ON e.kingdom = c.kingdom
    MINUS
    SELECT kingdom, phylum, element_id
    FROM SETS
) X
GROUP BY kingdom, phylum;
```

The partial join illustration above simply means that for each kingdom, construct the cartesian product of all element_id's and all phyla contained therein. To extend to the class level, a key may be added to the column lists and the columns may be joined until all levels have been constructed. To assemble the final result set, each intermediate category's signature may be applied to all subcategories below it. For example, if the above layers kingdom, phylum, etc., have been aggregated into temporary tables, i.e., kingdom_signatures (with columns kingdom, bf_signatures), phylum_signatures (with columns kingdom, phylum, and bf_signature), etc., each layer may be expanded with a partial join to the category hierarchy as follows:

```
SELECT k.kingdom, c.phylum, c.class, c.family, c.genus, bf_union(k.bf) as
bf_signature
FROM kingdom_signatures k
JOIN (select distinct kingdom, class, family, genus from SETS) c
on k.kingdom = c.kingdom
UNION
SELECT p.kingdom, p.phylum, c.class, c.family, c.genus, p.bf_signature
FROM: phylum_signatures p
JOIN (select distinct kingdom, class, family, genus from SETS) c
on p.kingdom = c.kingdom AND p.phylum = c.phylum
UNION
....
GROUP BY kingdom, phylum, class, family, genus;
```

According to certain embodiments in this disclosure, the include base cuboid may be built by directly aggregating all the elements that belong to each of the subsets. For example, the include base cuboid may be constructed via the following SQL query:

```
select kingdom, phylum, class, family, genus, bf_agg_shard(element_id using
parameters nshard=1, nbits=120000000,k=2) bf_signature
From SETS
GROUP BY kingdom, phylum, class, family, genus;
```

FIG. 6B illustrates an example similar to the example of FIG. 6A. In the example of FIG. 6B, the compliment of hierarchy 630 is hierarchy 630'. That is, each category of hierarchy 630 is mapped to its compliment within its parent in hierarchy 630'. Each category within hierarchies 630 and 630' contains members drawn from a small set ({1,2,3}). There are three levels in the example of FIG. 6B. These levels are level A 650, level B 660, and level C 670. To build the exclude base cuboid, each set found in each level of hierarchy 630' may be aggregated individually. At the lowest level, i.e., level C 670, a large number of small sets may be aggregated while at the top level, level A 650, one large set or a small number of large sets may be aggregated. To construct the full complement of a category, the path to root for the category may be followed on the resulting tree; i.e., hierarchy 630'.

Figure 7:
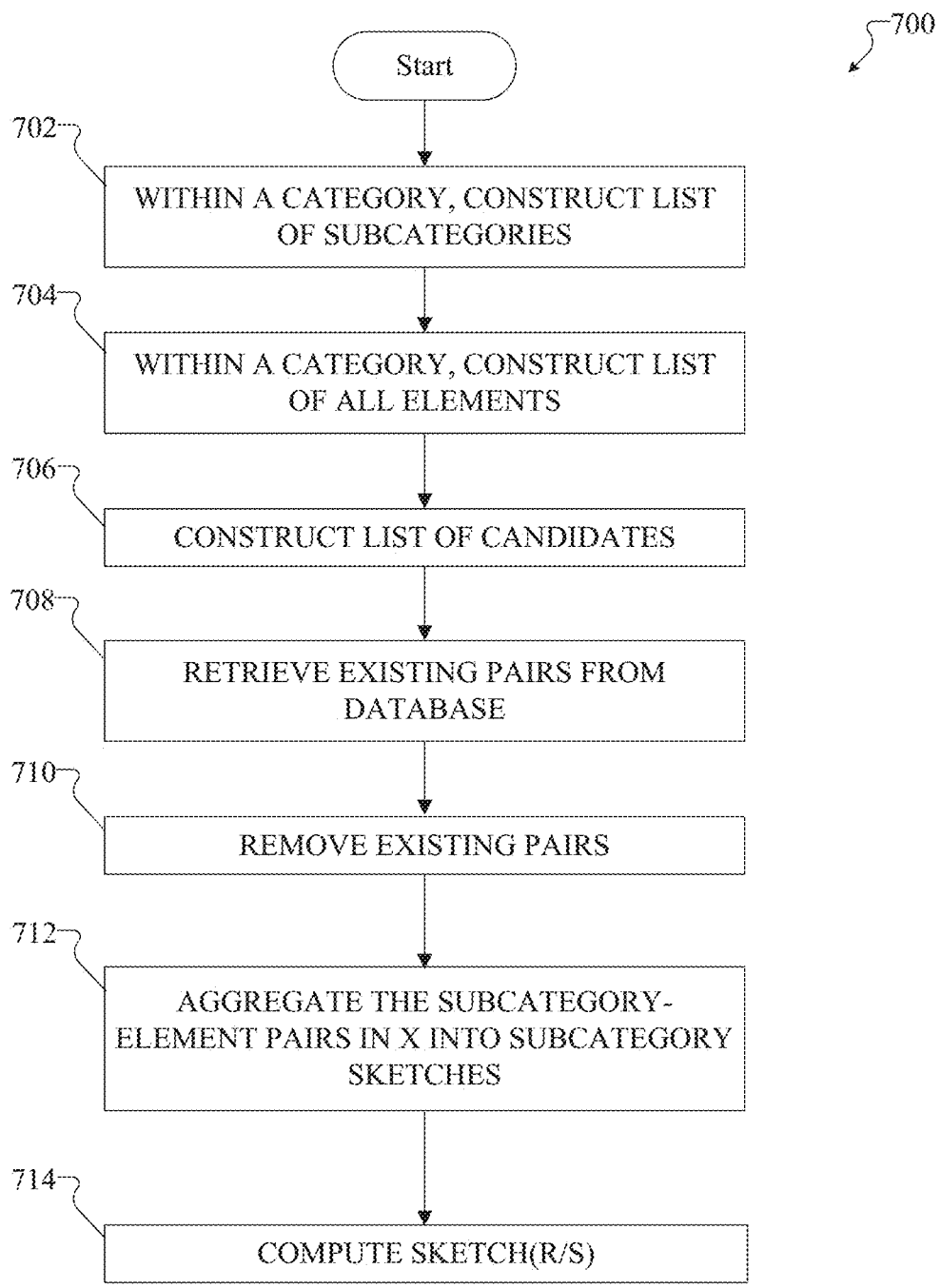
FIG. 7 illustrates procedural description of aggregation in pseudocode in accordance with certain embodiments of this disclosure.

FIG. 7 illustrates a detailed process for building exclude hypercubes in accordance with certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor and transmitter circuitry in, for example, a server.

Process 700 may use levelwise aggregation of set complements in a taxonomy. Given a number of small sets, sketches (e.g., Hyperloglog, Bloom Filters, etc.) of the complement of each set.

For example, a sketch for a set {A} may be generated by a function sketch(A), with an additional sketch-union operation which has the property that sketch-union(A,B)=sketch (A∪B). This may also be written as sketch-union (A1, A2 . . . An)=sketch(A1∪A2∪ . . . ∪An).

Given a hierarchical taxonomy where sets are divided into categories, and categories are divided into subcategories until individual sets are reached, the category complement may be constructed as follows.

At operation 702, a list (S) of subcategories may be constructed for each category. At operation 704, a (deduplicated) list [E] may be constructed. At operation 706, a list of candidates (C) may be constructed based on the results from operations 702 and 704. That is, the list of candidates (C) may be constructed as: C=S×E. At operation 708, a list (N) of existing subcategory-element pairs may be retrieved from a database, such as database 335. In step 710, existing pairs may be removed from the candidates; i.e., X=C−N. At operation 712, the subcategory-element pairs in X may be aggregated into subcategory sketches. These subcategory-element pairs represent the complement of each subcategory (s) within its parent category, sketch(E\s).

If a set (s) has a chain of parent categories s⊆C1⊆ C2⊆ . . . Cn⊆R, its complement can be written as: R\s=C1\s⊆C2\C1⊆ . . . ⊆R\Cn. Referring briefly to FIGS. 6A and 6B, from the category complement process described above, sketches for each term on the right have now been constructed. At operation 714, Sketch(R/s) may be computed; i.e., Sketch(R\s)=sketch-union(sketch(C1\s), sketch(C2\C1), sketch(R\Cn)).

As described, the above statistical approach may solve database join related issues. However, bloom filters may still need a considerable amount of space, depending on the expected sensitivity (True Positive Rate) and K, the number of hash functions. For example, to support 60 million unique PSIDs, 30 Megabytes or 240 Million bits may be needed. Some database platforms may only support 30 MB per row. In such a case, two shards of 15 MB or 120 Million bits each may be created. To store the include and exclude sets, this solution may be extended to any number of shards such that as many elements as needed may be stored in the in-cache memory. The signatures generated may be stored in a compressed format by applying, for example, the Z-Standard lossless compression technique (Zstd). For program targeting alone, at least 18 thousand unique cuboids may be used. Each cuboid may be 30 MB in size, resulting in 540K GB or half a TB of storage space.

Figure 8:
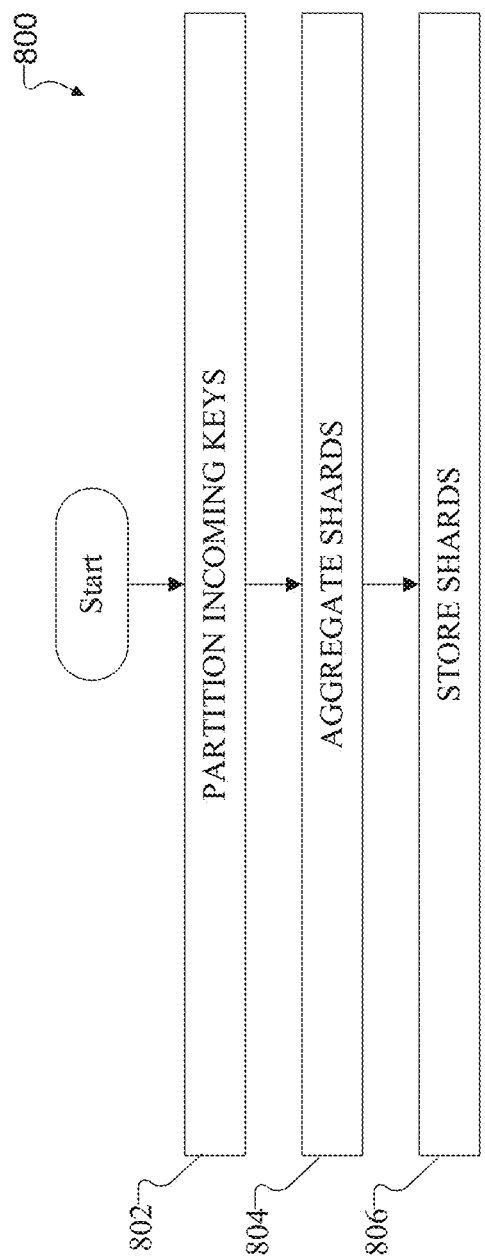
FIG. 8 illustrates a sharding technique in accordance with certain embodiments of this disclosure.

FIG. 8 illustrates a sharding technique in accordance with certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processor and transmitter circuitry in, for example, a server.

The process may begin at operation 802 with partitioning the incoming keys with an initial hash function applied into a set of shards, which together may make up an entire bloom filter. At operation 804, the shards may be aggregated. At operation 806, the shards may be stored all at once or separately depending on requirements. For example, the shards may be stored separately to reduce overall memory use or to fit within row size limits, while still retaining the functionality of the original bloom filter. Given a bloom filter of (m) bits and (k) hash functions, (s) shards may be constructed. Each shard may be a bloom filter with (m/s) bits and (k) hash functions. An initial hash function (h) may assigns each key to a shard number in [0,s]. To insert an element (x), h(x) may be computed. Once h(x) is computed, (x) may be inserted into the corresponding filter. To test an element (x), h(x) may again be computed within the corresponding filter. In either case, (x) may only be applicable to one shard, and use h(x) can be used to pre-partition data. For example, in order to optimize shard accesses.

For example, to construct only one shard, the following query may be run:

```
SELECT
    bf_agg_shard(id using parameters nshard=1, nshards=2, nbits=120000000,
k=2)
    FROM ids
    WHERE h(id using parameters nshards=2) = 0;
```

Figure 9:
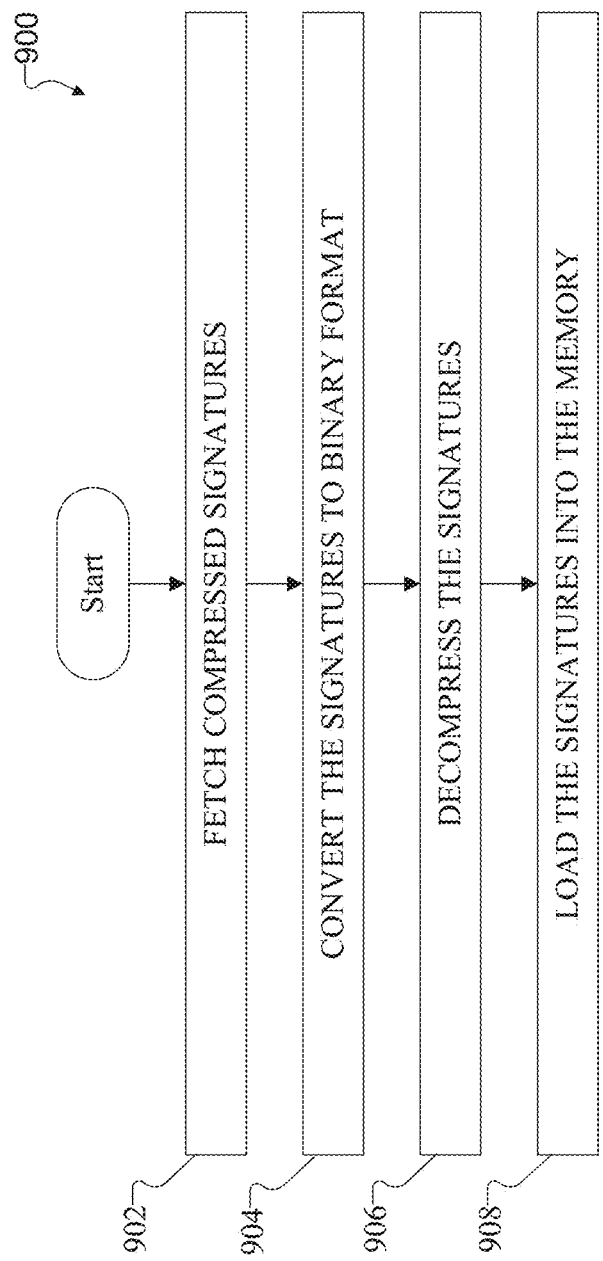
FIG. 9 illustrates a process for creating and updating signatures from a multidimensional dataset in accordance with certain embodiments of this disclosure.

FIG. 9 illustrates a process for transmission of signatures over a network in an advertising context. Once all the hypercubes for a given taxonomy are built and ready to be consumed in the targeting data mart, at operation 902, a schedular may run at a specified interval and fetch the compressed signatures. The signatures may be compressed in a HEX format to help avoid potential corruptions during transmission over a network. Once the data is completely read, at operation 904, signatures may be converted back from the HEX format to binary format. At operation 906, the signatures may be uncompressed. For example, a Zstd library may be used to decompress the signatures. At operation 908, the signatures may be loaded into in-memory cache.

In the ad server implementation example, once the ad server receives an ad request, the ad server will run a membership check against the in-memory cache instead of database joins, such as SQL joins. This may significantly reduce CPU time per ad request. In this example, the ad server may store 13 Billion elements in 7 GB memory space at a 15% false positive error rate or less.

In certain embodiments, effects of layering may be described as follows. From a dataset containing viewership of 18000 television program base cuboids, the effect of layering can be calculated via a pseudo-random hash into a three-level hierarchy with a 256-way split at the top level, followed by 16-way splits at the second level, and then into individual program cuboids.

In an experiment, each subcategory of the top-level may be averaged to approximately 8% of all unique viewers, meaning that its complement contains the other 92% of unique viewers. The second level of 4096 categories averages approximately 0.56% viewers. At lowers levels of 18000 individual program cuboids averaged 0.16% viewers. If the exclude sets are constructed without a layering approach, each exclude set would contain on average 99.84% of all viewers or about 1.35 million in total.

In contrast, layering methods in accordance with this disclosure may generate 256 exclude sets at the top level, each containing about 92% of the universe, 4096 sets at the second level, each containing about 8% of the universe, and 13512 sets averaging no more than 0.56%, for a total of 63,887%, about 21 times fewer viewer/set pairs to aggregate.

Bloom Filters typically aim for a false positive rate, which is a function of the number of elements inserted, and the number of bits in the bitmap which stores hashed element values. The false-positive rate is typically calculated as:

$$(1-e^{-kn/m})^k \qquad (1)$$

In Equation 1, k is the number of hash functions, n is the number of elements, and m is the number of bits. The filter may be split into (s) shards, each having the same total number of bits. Assuming the filter is split evenly, the number of keys in each shard is n/s, and the number of bits is m/s. The (s)s cancel out in the above expression. Accordingly, the false positive rate does not change as a result of sharding.

By implementing certain embodiments contained herein, an ad server may be able to lookup eligible placements within few microseconds. The ad server may serve the ad faster than defined SLAs. Ad fall outs due to time outs may also be reduced. In one experiment, the overall system through-put increased by 30%. In addition, implementations of certain embodiments contained herein enable the system with hypertargeting, a new feature which was not previously possible. These results may have a profound impact on the future revenue growth when applied to large scale applications.

While this disclosure focuses on an advertisement context, certain embodiments herein may be expanded to other matching applications with large scale datasets. For example, any system where a membership check is performed on a large dataset.

Although this disclosure has been described with reference to various example embodiments, various changes and modifications may be suggested to one skilled in the art. It is intended that this disclosure encompass such changes and modifications as fall within the scope of the appended claims.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

What is claimed is:
1. An electronic device comprising:
    at least one memory; and
    at least one processor operatively coupled to the at least one memory, the at least one processor configured to:
        create a plurality of sharded bloom filters based on signatures stored in the at least one memory, the signatures respectively being a representation of a set of elements in a bounded amount of bits, wherein, to create at least one of the plurality of sharded bloom filters, the at least one processor is configured to build a plurality of partial hypercubes, wherein each of the partial hypercubes comprises an include base cuboid and an exclude base cuboid that is a complement to the include base cuboid, and wherein the include base cuboid and the exclude base cuboid are hierarchies;
    perform at least one lookup using the plurality of sharded bloom filters; and output, via an application programming interface, a lookup result in real time.

2. The electronic device of claim 1, wherein:
each of the hierarchies includes at least one hierarchy level; and
at each hierarchy level, the include base cuboid contains an include subset from the set of elements that is mapped to an exclude subset from the set of elements that is contained in the exclude base cuboid.

3. The electronic device of claim 2, wherein, to build the exclude base cuboid, the at least one processor is configured to:
construct a plurality of exclude subsets from a data set, the data set comprising the set of elements, wherein the exclude subsets are based on evenly subdividing sets based on at least one category; and
generate an exclude signature for each of the exclude subsets.

4. The electronic device of claim 3, wherein:
to build the exclude base cuboid, the at least one processor is further configured to build subcategories from the exclude subsets using a partial join; and
wherein the partial join is a join between each exclude subset and its complement sub set.

5. The electronic device of claim 2, wherein, to build the include base cuboid, the at least one processor is configured to directly aggregate all elements in each of a plurality of include subsets.

6. The electronic device of claim 1, wherein the at least one processor is further configured to:
retrieve, at specified intervals, signatures based on at least one targeting criterion;
convert the signatures to binary format;
decompress the signatures; and
load the signatures into the at least one memory.

7. The electronic device of claim 1, wherein, to perform the at least one lookup, the at least one processor is configured to:
receive a request for the lookup result from an application, wherein the request comprises targeting criteria and a device identifier;
determine whether the device identifier is a member of the signatures; and
in response to determining that the device identifier is a member of the signatures, determine an output that includes the lookup result based on at least one of the plurality of sharded bloom filters, wherein the sharded bloom filters are associated with the targeting criteria.

8. A method comprising:
creating, by an electronic device, a plurality of sharded bloom filters based on signatures stored in a memory, the signatures respectively being a representation of a set of elements in a bounded amount of bits, wherein creating at least one of the plurality of sharded bloom filters comprises building a plurality of partial hypercubes, wherein each of the partial hypercubes comprises an include base cuboid and an exclude base cuboid that is a complement to the include base cuboid, and wherein the include base cuboid and the exclude base cuboid are hierarchies;
performing, by the electronic device, at least one lookup using the plurality of sharded bloom filters; and
outputting, by an application programming interface of the electronic device, a lookup result in real time.

9. The method of claim 8, wherein:
each of the hierarchies includes at least one hierarchy level; and
at each hierarchy level, the include base cuboid contains an include subset from the set of elements that is mapped to an exclude subset from the set of elements that is contained in the exclude base cuboid.

10. The method of claim 9, wherein building the exclude base cuboid comprises:
constructing a plurality of exclude subsets from a data set, the data set comprising the set of elements, wherein the exclude subsets are based on evenly subdividing sets based on at least one category; and
generating an exclude signature for each of the exclude subsets.

11. The method of claim 10, wherein:
building the exclude base cuboid further comprises building subcategories from the exclude subsets using a partial join; and
the partial join is a join between each exclude subset and its complement sub set.

12. The method of claim 10, wherein building the include base cuboid comprises:
directly aggregating all elements in each of a plurality of include subsets.

13. The method of claim 8, further comprising:
retrieving, at specified intervals, signatures based on at least one targeting criterion;
converting the retrieved signatures to binary format;
decompressing the retrieved signatures; and
loading the signatures into the memory.

14. The method of claim 10, wherein performing the at least one lookup comprises:
receiving a request for the lookup result from an application, wherein the request comprises targeting criteria and a device identifier;
determining whether the device identifier is a member of the signatures; and
in response to determining that the device identifier is a member of the signatures, determining an output that includes the lookup result based on at least one of the plurality of sharded bloom filters, wherein the sharded bloom filters are associated with the targeting criteria.

15. A non-transitory machine-readable medium comprising instructions that, when executed by at least one processor of an electronic device, cause the at least one processor to:
create a plurality of sharded bloom filters based on signatures stored in a memory, the signatures respectively being a representation of a set of elements in a bounded amount of bits, wherein the instructions that when executed cause the at least one processor to create at least one of the plurality of sharded bloom filters comprise instructions that when executed cause the at least one processor to build a plurality of partial hypercubes, wherein each of the partial hypercubes comprises an include base cuboid and an exclude base cuboid that is a complement to the include base cuboid, and wherein the include base cuboid and the exclude base cuboid are hierarchies;
perform at least one lookup using the plurality of sharded bloom filters; and
output, via an application programming interface, a lookup result in real time.

16. The non-transitory machine-readable medium of claim 15, wherein:
each of the hierarchies includes at least one hierarchy level; and
at each hierarchy level, the include base cuboid contains an include subset from the set of elements that is mapped to an exclude subset from the set of elements that is contained in the exclude base cuboid.

17. The non-transitory machine-readable medium of claim 16, wherein the instructions that when executed cause the at least one processor to build the exclude base cuboid comprise instructions that when executed cause the at least one processor to:
construct a plurality of exclude subsets from a data set, the data set comprising the set of elements, wherein the exclude subsets are based on evenly subdividing sets based on at least one category; and
generate an exclude signature for each of the plurality of exclude subsets.

18. The non-transitory machine-readable medium of claim 17, wherein:
the instructions that when executed cause the at least one processor to build the exclude base cuboid further comprise instructions that when executed cause the at least one processor to build subcategories from the plurality of exclude subsets using a partial join; and
the partial join is a join between each exclude subset and its complement sub set.

19. The non-transitory machine-readable medium of claim 16, wherein the instructions that when executed cause the at least one processor to build the include base cuboid comprise instructions that when executed cause the at least one processor to:
directly aggregate all elements in each of a plurality of include subsets.

20. The non-transitory machine-readable medium of claim 16, wherein the instructions that when executed cause the at least one processor to perform the at least one lookup comprise instructions that when executed cause the at least one processor to:
receive a request for the lookup result from an application, wherein the request comprises targeting criteria and a device identifier;
determine whether the device identifier is a member of the signatures; and
in response to determining that the device identifier is a member of the signatures, determine an output that includes the lookup result based on at least one of the plurality of sharded bloom filters, wherein the sharded bloom filters are associated with the targeting criteria.

* * * * *